United States Patent [19]

Rasmussen et al.

[11] 4,189,162
[45] Feb. 19, 1980

[54] HYDRAULIC CHUCK

[75] Inventors: Robert F. Rasmussen, Brooklyn Center; George R. Smida, Crystal; Robert L. Wietecha, Columbia Heights; Gary L. Pearson, Coon Rapids, all of Minn.

[73] Assignee: Air-Mo Hydraulics, Inc., Minneapolis, Minn.

[21] Appl. No.: 861,999

[22] Filed: Dec. 19, 1977

[51] Int. Cl.² ............................................. B23B 31/30
[52] U.S. Cl. ...................................... 279/4; 279/1 Q; 279/20
[58] Field of Search ............... 279/4, 51, 58, 41 R, 279/1 Q, 20

[56] References Cited

U.S. PATENT DOCUMENTS

| 2,455,019 | 11/1948 | McNeill | 279/1 Q |
|---|---|---|---|
| 2,469,198 | 5/1949 | Pointe | 279/1 Q |
| 2,844,377 | 7/1958 | Hull et al. | 279/1 Q |
| 2,909,376 | 10/1959 | Drew | 279/20 |
| 3,325,166 | 6/1967 | McCarthy | 279/1 Q |
| 3,871,138 | 3/1975 | Welsch | 279/1 Q |
| 3,962,769 | 6/1976 | Smida | 279/4 X |
| 4,014,311 | 3/1977 | Steere, Jr. | 279/4 X |

Primary Examiner—Horace M. Culver

[57] ABSTRACT

A hydraulic chuck having a piston means with an axially centered passage, the first end of which has a tube seating means associated therewith for engaging a tube. Collet means are provided and located at the first end of the piston means for engagement of the tube upon closure of the collet means. Biasing means operably connected to the piston means for normally forcing the surface means upon the collet means are also provided. Sealing means adjacent to tube feeding means for sealing the tube to the chuck, including seal seat means adjacent to collets and positioned to compress the seal radially inward under pressure of the biasing means, are provided. Finally, the handle or attachment means is provided to operably connect to the biasing means to remove the surface means from the collet means, thereby releasing the radially inward compression of the sealing means and permitting insertion of the tube.

7 Claims, 5 Drawing Figures

HYDRAULIC CHUCK

BACKGROUND OF THE INVENTION

Fluid pressure operated devices for radially expanding portions of tubing are known, such devices being disclosed in U.S. Pat. Nos. 1,448,457; 2,479,702; 2,938,562; and 3,200,627. Structures of these patents include fluid conveying mandrels receivable within the tubes, means for expanding the mandrels to hold the tubing, and die elements against which portions of the tubing are flared or otherwise formed by fluid pressure. These expanding devices are customarily used to provide short bulges in tubing for coupling purposes and the like. In addition, they are used to expand tubing to fit fins and other apparatus connected to the outer surface of the tubing.

Several hydraulic chucks have been developed which are suitable for tightly gripping one end of the elongated tube while simultaneously delivering a tube expanding fluid. Among these are U.S. Pat. Nos. 3,505,846; 3,813,751; and 3,962,769.

One of the problems which continuously plague those users of hydraulic chucks is the failure of seals after only a few operations of the hydraulic chuck. Various means have been developed to allow the user to temporarily connect a fluid system to a conductor such as in the process for hydrostatic testing of pipe, or in the placements of fins on air-conditioning tubing. All of these means use conventional, fixed, elastomeric seals to seal the connector or hydraulic chuck to the conductor or tube. While this results in an initially workable seal, it is often extremely shortlived due to damage inflicted by the rough end of the tube when the chuck is installed on the tubing. When the tubing is tested or is expanded for other purposes, the pressure within the system is oftentimes quite high. Thus, the seals are necessary to prevent passage or fluid into areas which would cause leaks, and more importantly the pressure must be maintained to accomplish its objectives.

Accordingly, it is an object of this invention to provide a tube engaging chuck which is capable of maintaining adequate sealing through competitive uses. Another object of this invention is to provide a chuck which can readily grip the tube to be expanded, permitting preloading of the tube prior to the expansion. This is a particular advantage in complicated assemblies where a large tube or a multiplicity of tubes are being expanded in an apparatus wherein the relationship spacially of one tube to another is critical. By being able to preload the tubes with fluid, it is possible to rearrange and restructure the relative relationships of the tubes immediately prior to expansion without any surge occuring from the addition of fluid to the tubes themselves.

SUMMARY OF THE INVENTION

The present invention relates to a hydraulic chuck, comprising a plurality of parts in interworking relationship which accomplish the above described objects. Specifically, a piston means is provided having an axially centered passage, the first end of the piston having a tube seating means associated therewith for engaging the tube to be expanded. Collet means are located at the first end of the piston tube for engagement of the tube upon closure of the collet means. Surface means bearing upon the collet means are positioned to close the collet means upon hydraulic pressure being applied. Biasing means are operably connected to the piston means and are adapted to normally force the surface means on the collet means, thereby closing the collet means. Sealing means are positioned adjacent the tube seating means for sealing the tube to the chuck and preventing loss of pressure during operation. Included in the sealing means are seal seat means adjacent the collets and positioned to compress the seal radially inward under pressure of the biasing means. When the chuck is operated under hydraulic pressure, the forces which cause the surface means to assert additional pressure on the collet means additionally force the seal seat means against the seal to further increase the effect of the sealing means during operation. Finally, attachment means are provided which are operably connected to the biasing means to remove the surface means from the collet means, thereby releasing the radially inward compression of the sealing means and permitting insertion of the tube. In a preferred embodiment, the sealing means includes a first radially inward extending first portion of an elastomer having a hardness of at least 70 durometer and a second body portion radially outward of the first portion and having a hardness of less than 70 durometer. The function of these two hardnesses will be explained hereinafter but it will be readily apparent that the harder portion is in contact with the tube after being inserted while the softer portion is that portion which is compressed during operation by the biasing means.

DESCRIPTION OF THE DRAWINGS

For a more complete understanding of the invention, reference is hereby made to the drawings in which.

DETAILED DESCRIPTION OF THE INVENTION

Figure 1:
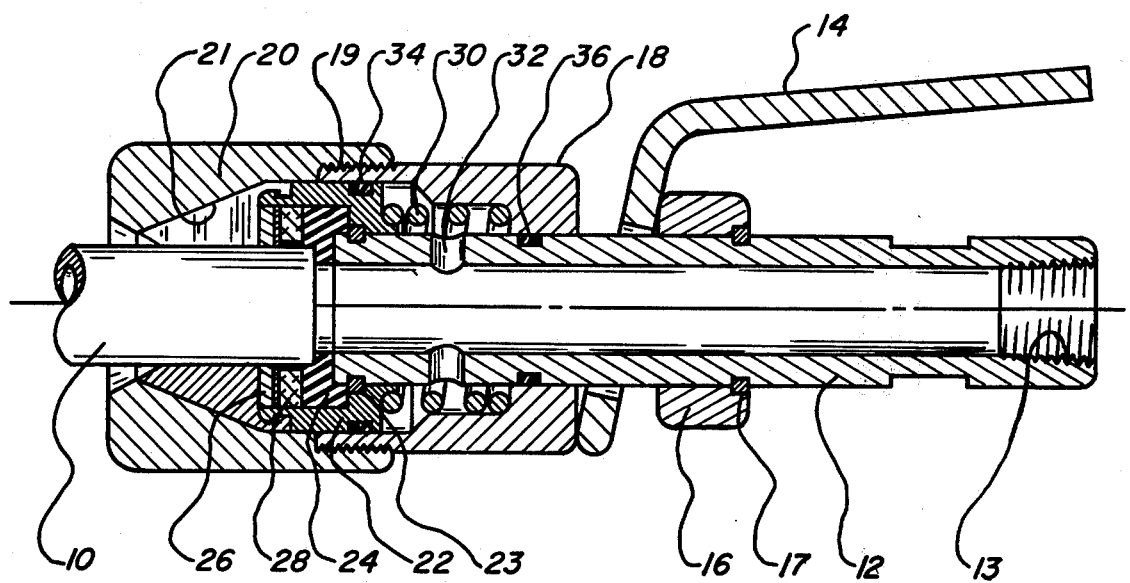
FIG. 1 is a partially section view showing one embodiment of this invention holding a tube.
Figure 2:
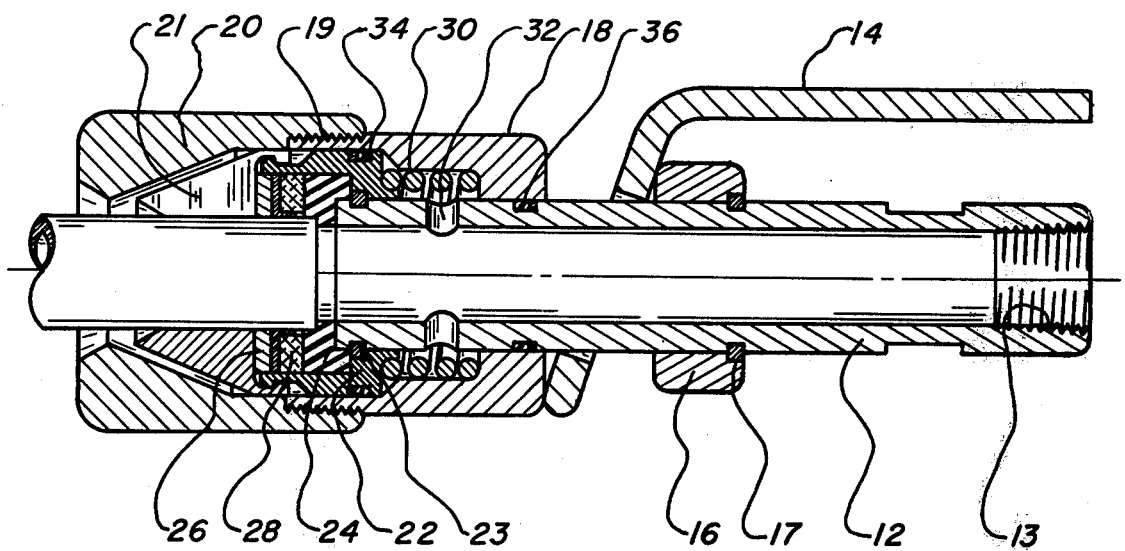
FIG. 2 is a partially section view of the same embodiment, in an open position.

As shown in FIGS. 1 and 2, a tube 10 is positioned in a hydraulic chuck according to the present invention. The outer body 12 of the chuck contains threading means 13 for attachment to a fluid system (this is not shown) and defines a fluid passage for transmitting fluid to the tube 10. An operating handle 14 is provided for engagement and release of the gripping means hereinafter described. The operating handle 14 is positioned between the cylinder body 18 and the handle ring 16. The handle ring 16 is fixedly mounted to the body 12 through split ring 17 so that depression of the operating handle 14 will force the cylinder body 18 and the assembly connected therewith in a direction away from the handle ring 16.

Attached to the cylinder body 18 through threads 19 is nose portion 20 which contains a surface means bearing against collets 21. A piston means 22 is attached through split ring 23 to the body 12 of the chuck.

A tube seat 24 is positioned to receive the tube 10 at the end of the body 12 of the chuck. Adjacent the tube seat 24 and in operable relationship with the tube 10 is a seal 28 which in turn is held in position by a seal seat 26. Biasing means 30, in the form of a spring or other biasing means, are provided to force the piston 22 in the direction toward the collets 21, thereby forcing the collet 21 against the surface bearing means of the nose 20. This pressure forces the seal seat 26 against the seal 28 where it is compressed between the seal seat 28 and the tube seat 24. Compression of the seal 28 causes expansion of the seal 28 radially inwardly to contact and grip the tube 10, thereby forming a suitable seal.

A pressure rising port 32 is provided which permits passage of fluid through the fluid passage defined by the body 12, through the port 32 and into contacting relationship with the piston 22. Thus, when the system is pressurized, fluid pressure forces additional pressure on the piston 22, thereby strengthening the grip of the collets 21 as they are forced against the surface bearing portion of nose 20. As the internal pressure of the chuck is increased, this pressure is passed on to further increase the compression of the seal 28 between the seal seat 26 and the tube seat 24.

The piston seal 34 is located in the piston to prevent passage of fluid past the piston and out of the chuck. Body seal 36 is also provided to prevent reverse flow of the fluid in the chuck. Neither the body seal 36 nor the piston seal 34 are subjected to contact with the tube 10, however, and conventional o-ring seals here have been found to be suitable.

As can be seen in FIG. 2, depression of the handle 14 forces the cylinder 18 away from the handle ring 16. Since the nose portion 20 is fixedly mounted to the cylinder 18 through threads 19, the nose portion 20 is removed from the collets 21, thereby allowing the collets to relax and the device is in an open or released condition. Accordingly, the tension in biasing means or spring 30 should be sufficient to maintain a normally closed position, but should not be strong enough to prohibit the use of handle 14 as just described.

Figure 3:
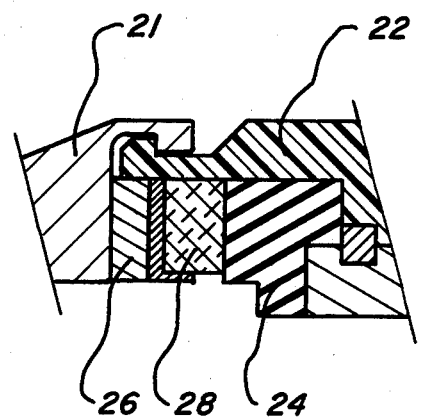
FIG. 3 is a detailed section of the seal embodied in this invention, in a released position.
Figure 4:
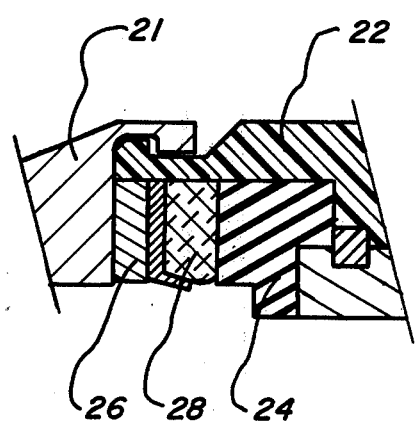
FIG. 4 is a detailed section view of the seal of FIG. 3 in a closed or seated position.

As shown in FIG. 3, when the handle is depressed as described in FIG. 2, the seal seat 26 and the tube seat 24 are not forced against the seal 28 since the collets 21 are free to move. Construction of an appropriately shaped seal permits retraction of the seal as shown in FIG. 3. When the handle 14 is released, and the device assumes the position as shown in FIG. 1, the seal acts under compression as shown in FIG. 4. Specifically, the collets 21 are then forced against the surface bearing means by piston 22. This pressure causes compression of the seal seat 26 against the seal and is opposed by the tube seat 24. Thus the seal 28 expands radially inwardly to grip and seal the tube.

Figure 5:
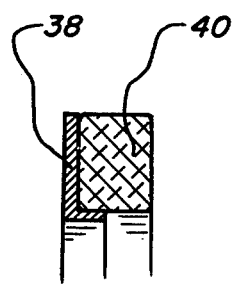
FIG. 5 is a view of a preferred embodiment of this invention showing a seal suitable for use in the device of this invention.

As shown in FIG. 5, the specific construction of the seal is comprised of an elastomer having two different degrees of hardness, as in this preferred embodiment. Typical materials from which the seal may be made are the various elastomers such as, for example, buna N rubber. It is preferred that the first radially inwardly extending first portion 38 of the seal 28 have a hardness of at least 70 durometer and preferably between 70 and 100 durometer. Similarly, it is preferred that the second body portion 40 of the seal 28 which is radially outward of the first portion 38 has a hardness of less than 70 durometer and preferably between 40 and 70 durometer. It should be readily apparent that the harder portion 38 is in contact with the tube, although it is withdrawn during insertion and removal of the tube, and the softer inner portion 40 is positioned to receive the compression between the tube seat 24 and the seal seat 26. A softer material will obviously compress more readily, thereby causing a greater movement of the seal radially inwardly to grip the tube.

Thus it can be seen that the chuck of this invention may be placed on a tube by depression of handle and placement of the tube into the cavity provided therefor. The collets serve to grip the tube to prevent movement under normal conditions, while the seal prevents passage of fluid out of the chuck during pressurization. Depression of the handle causes the seal to be removed from contact with the tube, thereby substantially increasing the life of the seal and accordingly permitting substantially more economical use of the hydraulic chuck.

What is claimed is:

1. A hydraulic chuck comprising:
   piston means having an axially centered passage, and a first end of said piston means having a tube seating means associated therewith for engaging a tube;
   collet means located at said first end of said piston means for engagement of said tube upon closure of said collet means;
   surface means bearing against said collet means to close said collet means;
   biasing means operably connected to said piston means for normally forcing said surface means upon said collet means;
   sealing means adjacent said tube, seating means for sealing said tube to said chuck, including seal seat means adjacent said collet positioned to compress said seal radially inward under pressure of said biasing means; and
   attachment means operably connected to said biasing means to remove said surface means from the collet means to release said radially inward compression of said sealing means and permit insertion of said tube.

2. The device of claim 1 which further includes passage defining means in said piston to force said surface means onto said collet means upon passage of fluid in said axially centered passage.

3. The device of claim 1 wherein said surface means further includes body means for enclosing said piston in said biasing means, said body means containing sealing means for prevention of passage fluid through the interface between the surface means and the collet means.

4. The device of claim 1 wherein said attachment means include pivot means operating against the force of said biasing means in an amount sufficient to remove pressure of said surface means on said collet means.

5. The device of claim 1 wherein said collet means are fixedly positioned with respect to said piston means, and said attachment means is adapted to slidably move said collet means to remove said piston means in a direction away from said surface means to remove closing pressure on said collet means.

6. The device of claim 1 wherein said sealing means includes a first radially inward extending first portion of a hardness of at least 70 durometer, and a second body portion radially outward of said first portion having a hardness of less than 70 durometer.

7. The device of claim 6 wherein said first and second portions have a hardness ranging from 70 to 100 durometer and 40 to 70 durometer respectively.

* * * * *